United States Patent
MP

(10) Patent No.: US 10,713,082 B2
(45) Date of Patent: Jul. 14, 2020

(54) CLOUD PLATFORM INTEGRATION LOAD BALANCER

(71) Applicant: SAP SE, Walldorf (DE)

(72) Inventor: Deepak MP, Bangalore (IN)

(73) Assignee: SAP SE, Walldorf (DE)

( * ) Notice: Subject to any disclaimer, the term of this patent is extended or adjusted under 35 U.S.C. 154(b) by 101 days.

(21) Appl. No.: 16/202,272

(22) Filed: Nov. 28, 2018

(65) Prior Publication Data
US 2020/0167179 A1    May 28, 2020

(51) Int. Cl.
*G06F 9/455* (2018.01)
*G06F 9/52* (2006.01)

(52) U.S. Cl.
CPC ......... *G06F 9/45558* (2013.01); *G06F 9/526* (2013.01); *G06F 2009/4557* (2013.01); *G06F 2009/45595* (2013.01)

(58) Field of Classification Search
CPC ................. G06F 9/45558; G06F 9/526; G06F 2009/45557; G06F 2009/45595
USPC .......................................................... 718/1
See application file for complete search history.

(56) References Cited

U.S. PATENT DOCUMENTS

| | | | | |
|---|---|---|---|---|
| 8,023,528 B2* | 9/2011 | Hendel | ............ | G06F 15/17375 370/463 |
| 8,171,201 B1* | 5/2012 | Edwards, Sr. | ...... | G06F 9/45558 711/112 |
| 8,725,973 B2* | 5/2014 | Prahlad | ............... | G06F 11/1453 711/162 |
| 8,752,057 B1* | 6/2014 | Gould | ..................... | G06F 9/526 718/102 |
| 8,966,074 B1* | 2/2015 | Richards | ................. | H04L 47/10 709/224 |
| 9,052,961 B2* | 6/2015 | Mangtani | .............. | G06F 9/5072 |

(Continued)

OTHER PUBLICATIONS

A. Anand, M. Dhingra, J. Lakshmi and S. K. Nandy, "Resource usage monitoring for KVM based virtual machines," 2012 18th International Conference on Advanced Computing and Communications (ADCOM), Bangalore, 2012, pp. 66-70. (Year: 2012).*

(Continued)

*Primary Examiner* — Andrew M. Lyons
(74) *Attorney, Agent, or Firm* — Buckley, Maschoff & Talwalkar LLC

(57) ABSTRACT

A method and system including two or more virtual machines; a load balancer module; a load balancer processor in communication with the load balancer module and operative to execute processor-executable process steps to cause the system to: initiate an application integration component; create a set of one or more integration steps to transfer data between a cloud-based application and a second application; receive selection of an element of a virtual machine; broadcast a current state of each virtual machine to the other virtual machines; determine which of the two or more virtual machines has a pre-set amount of the selected element; retrieve a mutual exclusion component, wherein the mutual exclusion component is retrieved by the virtual machine determined to have the pre-set amount of the selected element; and execute the integration steps at the virtual machine that retrieved the mutual exclusion component. Numerous other aspects are provided.

20 Claims, 6 Drawing Sheets

(56) References Cited

U.S. PATENT DOCUMENTS

| | | | |
|---|---|---|---|
| 9,075,661 B2* | 7/2015 | Hopmann | G06F 9/5044 |
| 9,400,692 B2* | 7/2016 | Reed | G06F 9/5016 |
| 9,645,858 B2* | 5/2017 | Winterfeldt | G06F 8/60 |
| 9,692,632 B2* | 6/2017 | Bhattacharya | H04L 67/1097 |
| 9,742,873 B2* | 8/2017 | Ananthanarayanan | G06F 9/5072 |
| 9,753,758 B1* | 9/2017 | Oldenburg | G06F 9/45558 |
| 10,013,267 B1* | 7/2018 | Wagner | G06F 9/4887 |
| 10,031,783 B2* | 7/2018 | Jalagam | G06F 9/5077 |
| 10,055,245 B1* | 8/2018 | Gupta | G06F 9/44505 |
| 10,120,668 B2* | 11/2018 | Palavalli | G06F 9/5077 |
| 10,133,749 B2* | 11/2018 | Thakkar | G06F 16/1748 |
| 10,228,969 B1* | 3/2019 | Gupta | G06F 9/541 |
| 2003/0097360 A1* | 5/2003 | McGuire | G06F 9/52 |
| 2004/0221290 A1* | 11/2004 | Casey | G06F 9/45558 718/104 |
| 2004/0230972 A1* | 11/2004 | Donovan | G06F 9/544 718/1 |
| 2008/0127198 A1* | 5/2008 | Cometto | G06F 9/5016 718/105 |
| 2011/0022812 A1* | 1/2011 | van der Linden | H04L 67/1097 711/163 |
| 2012/0216193 A1* | 8/2012 | Lee | G06F 9/45558 718/1 |
| 2012/0284234 A1* | 11/2012 | Mashtizadeh | G06F 16/119 707/655 |
| 2014/0052864 A1* | 2/2014 | Van Der Linden | H04L 47/70 709/226 |
| 2014/0250436 A1* | 9/2014 | Tang | H04L 67/101 718/1 |
| 2015/0052529 A1* | 2/2015 | Benhase | G06F 9/46 718/102 |
| 2015/0237132 A1* | 8/2015 | Antony | H04L 67/1095 709/224 |
| 2015/0378785 A1* | 12/2015 | Tarasuk-Levin | G06F 9/45558 718/1 |
| 2016/0103712 A1* | 4/2016 | Thakkar | G06F 9/4856 707/610 |
| 2017/0061145 A1* | 3/2017 | Vajravel | G06F 9/4411 |
| 2017/0134339 A1* | 5/2017 | Bortnikov | G06F 9/45558 |
| 2017/0206103 A1* | 7/2017 | Arndt | G06F 9/45558 |
| 2017/0235507 A1* | 8/2017 | Sinha | G06F 3/0665 711/114 |
| 2018/0121225 A1* | 5/2018 | Sanghavi | G06F 9/5077 |
| 2018/0150312 A1* | 5/2018 | Gupta | G06F 9/45558 |
| 2018/0213089 A1* | 7/2018 | Richards | H04L 41/16 |
| 2018/0217776 A1* | 8/2018 | Ajila | G06F 3/0604 |
| 2019/0034224 A1* | 1/2019 | Mitevski | G06F 9/485 |
| 2019/0065277 A1* | 2/2019 | Raikov | H04L 41/5048 |
| 2019/0138341 A1* | 5/2019 | Koh | G06F 9/45558 |
| 2019/0213104 A1* | 7/2019 | Qadri | G06F 21/12 |
| 2019/0235896 A1* | 8/2019 | Semmandampalayam | G06F 8/60 |
| 2019/0236683 A1* | 8/2019 | Anand | G06F 16/00 |
| 2019/0258530 A1* | 8/2019 | Moldvai | G06F 11/1484 |
| 2019/0303192 A1* | 10/2019 | Devendran | G06F 9/45558 |
| 2019/0310881 A1* | 10/2019 | Gupta | G06F 9/45558 |
| 2019/0384649 A1* | 12/2019 | Wen | G06F 9/5077 |

OTHER PUBLICATIONS

Bhatt and H. A. Bheda, "Enhance load balancing using Flexible load sharing in cloud computing," 2015 1st International Conference on Next Generation Computing Technologies (NGCT), Dehradun, 2015, pp. 72-76. (Year: 2015).*

C. Chang, S. Yang, E. Yeh, P. Lin and J. Jeng, "A Kubernetes-Based Monitoring Platform for Dynamic Cloud Resource Provisioning," Globecom 2017—2017 IEEE Global Communications Conference, Singapore, 2017, pp. 1-6. (Year: 2017).*

T. C. Chieu, A. Mohindra, A. A. Karve and A. Segal, "A Cloud Provisioning System for Deploying Complex Application Services," 2010 IEEE 7th International Conference on E-Business Engineering, Shanghai, 2010, pp. 125-131. (Year: 2010).*

M. Liu and T. Li, "Optimizing virtual machine consolidation performance on NUMA server architecture for cloud workloads," 2014 ACM/IEEE 41st International Symposium on Computer Architecture (ISCA), Minneapolis, MN, 2014, pp. 325-336. (Year: 2014).*

* cited by examiner

CLOUD PLATFORM INTEGRATION LOAD BALANCER

BACKGROUND

Cloud integration refers to the combination of tools, technologies and practices an organization may use to connect applications, systems, data, and entire information technology environments, where at least one party is cloud-based. For example, such integration may occur between different cloud providers, platforms and applications, as well as between cloud-hosted and local or on-premises resources. A common form of cloud integration is data integration, which aims to share or synchronize data between data stores. Another type of cloud integration is application integration, where two or more applications can share states, requests, commands and other mechanisms to implement processes.

In a cloud environment, multiple virtual machines may be assigned to an organization and may be available to receive data as a result of the integration (e.g., data integration or application integration). Often a single virtual machine receives the data, however, so as not to duplicate the data on all of the virtual machines. Typically, one of the virtual machines receives a lock in a random process that may prevent the other virtual machines from receiving the data. When a single virtual machine receives data from multiple sources at a same or similar time, this may result in slower processing of the data, and may result in a crash of the virtual machine due to limited availability of resources (Memory and CPU).

Systems and methods are desired which support efficient selection of the virtual machine to receive the lock.

DETAILED DESCRIPTION

Figure 1:
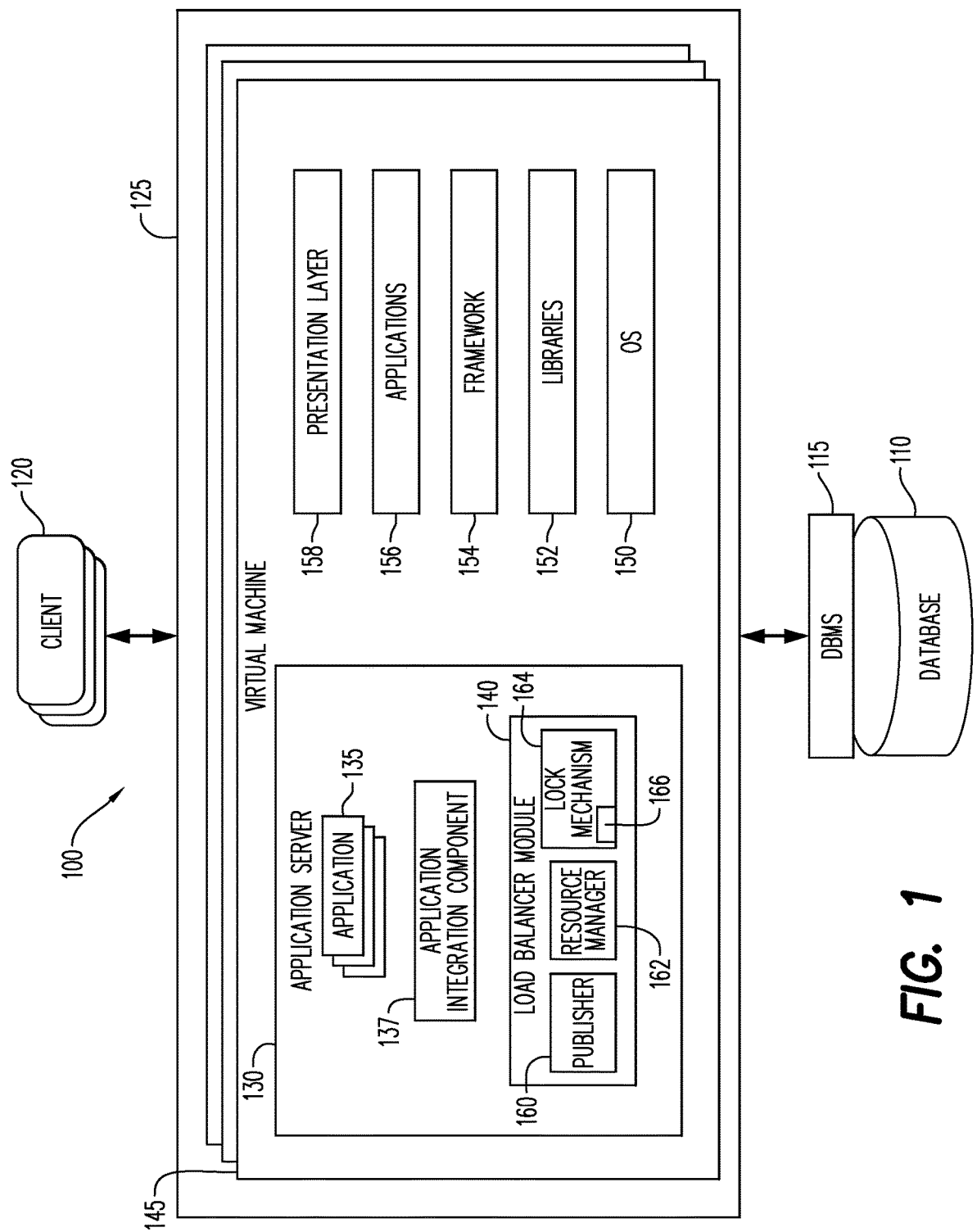
FIG. 1 is a block diagram of a system architecture according to some embodiments.
Figure 2:
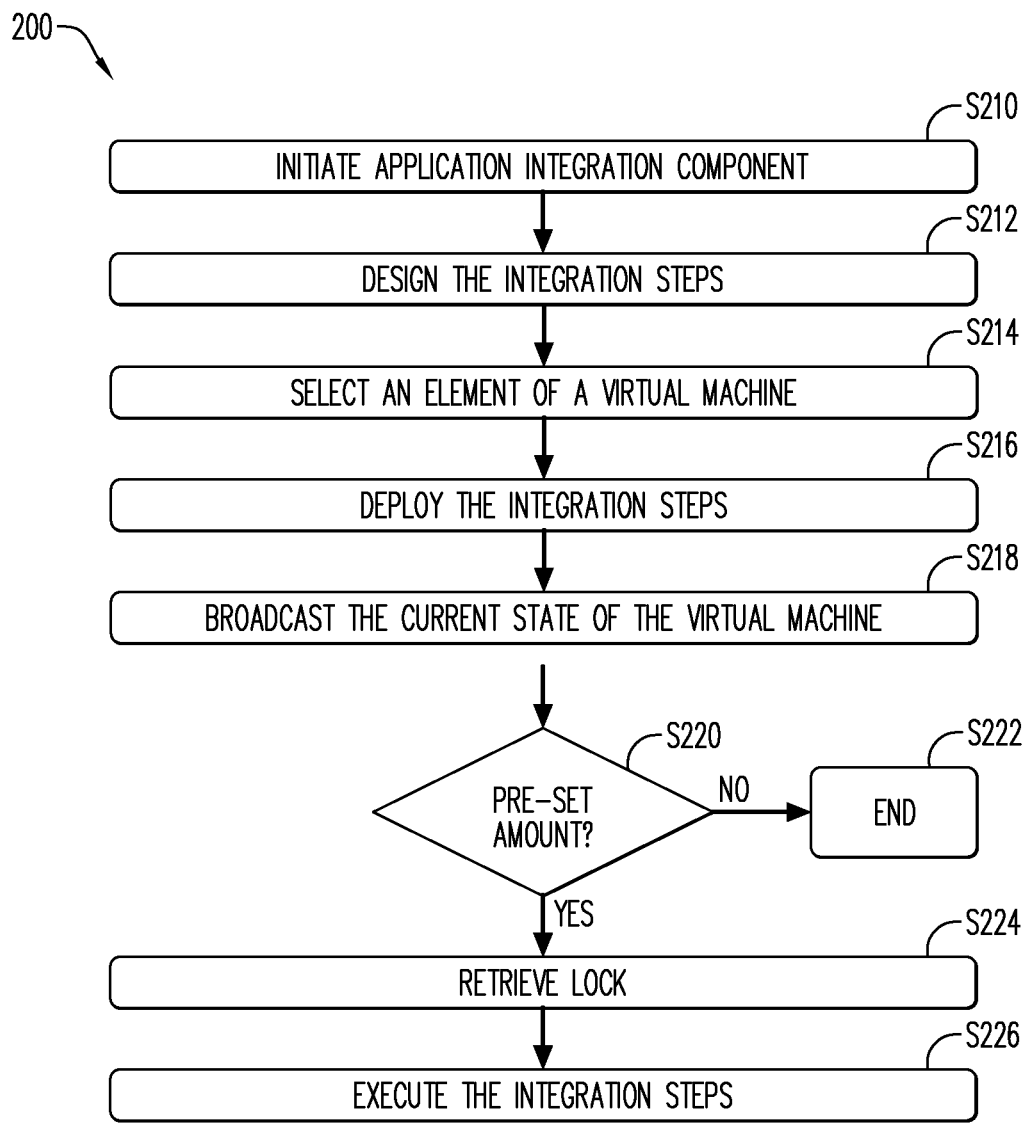
FIG. 2 is a flow diagram according to some embodiments.

The following description is provided to enable any person in the art to make and use the described embodiments and sets forth the best mode contemplated for carrying out some embodiments. Various modifications, however, will remain readily apparent to those in the art.

One or more embodiments or elements thereof can be implemented in the form of a computer program product including a non-transitory computer readable storage medium with computer usable program code for performing the method steps indicated herein. Furthermore, one or more embodiments or elements thereof can be implemented in the form of a system (or apparatus) including a memory, and at least one processor that is coupled to the memory and operative to perform exemplary method steps. Yet further, in another aspect, one or more embodiments or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

A cloud platform is built up from numerous physical machines (e.g., the hardware). Each of these physical machines may then run multiple virtual machines, where the virtual machines may share the resources of the single physical machine. The virtual machine may be presented to an end-user.

During cloud platform integration (CPI) to integrate applications, two or more applications can share data related to the states, requests, commands and other mechanisms to implement processes, as described above. For each element shared between the applications, integration steps may be created to share the data. For example, if System A wants to communicate/share data with system B via an HTTP protocol, and system B communicates/shares data via an OData protocol, there maybe a problem in that these protocols may not be compatible. The integration steps may be used to allow the two systems to communicate with each other. Further, each set of integration steps may be different, depending on the complexity of the scenario that is modelled by the steps and the amount of data that is being processed. To that end, each set of integration steps may need a different amount of resources (e.g., memory and Computer Processing Unit (CPU) processing time).

Conventionally, when a user registers with a cloud platform, they are assigned one or more virtual machines. Then during CPI, each set of integration steps may be deployed on the virtual machines assigned of the user. However, the integration steps may only be executed on one of the virtual machines to avoid duplicating data. A lock or mutex may be used to determine which virtual machine executes the integration steps. As used in the art, a lock or mutex is a synchronization mechanism for enforcing limits on access to a resource in an environment where there are many threads of execution. A lock may be designed to enforce a mutual exclusion concurrency control policy. As such, the virtual machine that obtains the lock is the virtual machine that executes the integration steps. Typically the virtual machines simultaneously vye with each other to obtain the lock in a random process where the first virtual machine to obtain the lock receives the lock.

As described above, each set of integration steps may need a different amount of resources. The more complex the set of integration steps, the more memory it may consume and the more CPU processing time it may require to process the set of integration steps. For example, a set of integration steps may be designed that consume a lot of memory. As another example, a set of integration steps may be designed that is for a real-time integration and needs a quick CPU processing time (e.g., stock market data). Further, each virtual machine may have different amounts of available memory and CPU processing time to be consumed by the set of integration steps. As the typical lock process is random, there is no way to distribute the set of integration steps uniformly to the virtual machines based on the resource requirements of the integration steps and resource availability of the virtual machines. As a result, many sets of integration steps may be executed in a virtual machine with limited resources, which may result in slower processing and in some instances even crashing the virtual machine because the set of integration steps consumed more memory than the virtual machine had available. In some instances, not only is the set of integration steps that caused the crash halted, but also the other currently executing sets of integration steps in that virtual machine are halted.

Embodiments provide a load balancer module to uniformly distribute the execution of the set of integration steps across multiple virtual machines depending on the availability of the resources (e.g., memory and CPU processing time) on the respective virtual machine. Embodiments provide for the virtual machine with either the least amount of memory used or least amount of CPU processing time used to be selected to execute the integration steps. Embodiments provide for the load balancer module to allow the user to choose the virtual machine to execute the set of integration steps based on the resource requirements of the set of integration steps. For example, if the set of integration steps needs more memory (or more CPU processing time), the user may indicate this resource is more important and then the load balancer module may select the virtual machine with the appropriate amount of available memory (or CPU processing time). In one or more embodiments, the load balancer module may select the virtual machine with the most available amount of the user-specified resource from a list of available virtual machines for that user.

As used herein, the "integration steps" may also be referred to as an "integration flow". In the embodiments described herein, a graphical tool may be used to configure the integration steps (e.g., specify how the two or more different applications can integrate), and this set of integration steps may be referred to as an "iflow," but any suitable configuration process may be used.

FIG. 1 is a block diagram of system architecture 100 according to some embodiments. Embodiments are not limited to architecture 100 or to a three-tier database architecture.

Architecture 100 includes database 110, database management system or service (DBMS) 115, a client 120, software architecture 125 including an application server 130, applications 135, a load balancer module 140, and one or more virtual machines 145. Applications 135 may comprise server-side executable program code (e.g., compiled code, scripts, etc.) executing within application server 130 to receive queries from clients 120 and provide results to clients 120 based on data of database 110 per the DBMS 115. In one or more embodiments, the application server 130 may be deployed on the virtual machine 145, and the load balancer module 140 is one of the applications 135. In one or more embodiments, a client 120 may use the load balancer module 140 to select a particular virtual machine 145 on which to execute an iflow 302. Once the integration steps are executed, different applications may be able to communicate with each other, which may facilitate organizational operations.

In the example architecture of FIG. 1, the software architecture 125 one or more virtual machines 145, and each virtual machine 145 may include its own application server 130. A virtual machine 145 creates a software environment where applications/modules can execute as if they were executing on a hardware computing device. A virtual machine is hosted by a host operating system (not shown) and typically, although not always, has a virtual machine monitor (not shown) which manages operation of the virtual machine as well as the interface with the host operating system. A software architecture executes within the virtual machine such as an operating system 150, libraries 152, frameworks/middleware 154, applications 156 and/or presentation layer 158. These layers of software architecture executing within the virtual machine 145 may be the same as corresponding layers in the software architecture (not shown).

The virtual machine 145 may include, as an application in the application server 130, the load balancer module 140. The load balancer module 140 may written in JAVA®, or any other suitable language. The load balancer module 140 may include a publisher 160, a resource manager 162 and a mutual exclusion component 164. As used herein, the terms "element manager" and "resource manager" may be used interchangeably. As used herein, the terms "mutual exclusion component" and "lock mechanism" and "lock" may be used interchangeably. The publisher 160 may be responsible for broadcasting a current state of a virtual machine to its peer virtual machines. The current state data elements may include current memory or CPU processing time status and the virtual machine's unique identifier (id). The virtual machine's unique id may be used to identify the virtual machine. The resource manager 162 may capture the broadcasted messages from other virtual machines regarding the current state of the other virtual machine. The resource manager 162 may then use this message from the other virtual machine(s) to compare the current state of its associated virtual machine to the current state of the other peer virtual machines. As described further below, when the resource manager 162 determines its associated virtual machine has more resources compared to its peer virtual machines, the resource manager may proceed to a next step to acquire the lock 166 from the lock mechanism 164 to execute the iflow. When the resource manager 162 determines its associated virtual machine has less resources compared to its peer virtual machines, the resource manager does not try to acquire the lock, and does not execute the iflow. The lock mechanism 164 ensures that only one virtual machine acquires the lock 166, as only one virtual machine may execute the iflow, according to one or more embodiments.

Application server 130 provides any suitable interfaces through which clients 120 may communicate with the load balancer module 140 or applications 135 executing on application server 130. The application server 130 may include an application integration component 137. The application integration component 137 may be an application tool executed by a user to connect a cloud application with other cloud and on-premises applications.

One or more applications 135 executing on server 130 may communicate with DBMS 115 using database management interfaces such as, but not limited to, Open Database Connectivity (ODBC) and Java Database Connectivity (JDBC) interfaces. These types of applications 135 may use Structured Query Language (SQL) to manage and query data stored in database 110.

DBMS 115 serves requests to retrieve and/or modify data of database 110, and also performs administrative and management functions. Such functions may include snapshot and backup management, indexing, optimization, garbage collection, and/or any other database functions that are or become known. DBMS 115 may also provide application logic, such as database procedures and/or calculations, according to some embodiments. This application logic may comprise scripts, functional libraries and/or compiled program code.

Application server 130 may be separated from, or closely integrated with, DBMS 115. A closely-integrated application server 130 may enable execution of server applications 135 completely on the database platform, without the need for an additional application server. For example, according to some embodiments, application server 130 provides a comprehensive set of embedded services which provide end-to-end support for Web-based applications. The services may include a lightweight web server, configurable support for OData, server-side JavaScript execution and access to SQL and SQLScript.

Application server 130 may provide application services (e.g., via functional libraries) which applications 135 may use to manage and query the data of database 110. The application services can be used to expose the database data model, with its tables, hierarchies, views and database procedures, to clients. In addition to exposing the data model, application server 130 may host system services such as a search service.

Database 110 may store data used by at least one of: applications 135 and the load balancer module 140. For example, database 110 may store data values that may be used by the load balancer module 140 during the execution thereof.

Database 110 may comprise any query-responsive data source or sources that are or become known, including but not limited to a structured-query language (SQL) relational database management system. Database 110 may comprise a relational database, a multi-dimensional database, an eXtendable Markup Language (XML) document, or any other data storage system storing structured and/or unstructured data. The data of database 110 may be distributed among several relational databases, dimensional databases, and/or other data sources. Embodiments are not limited to any number or types of data sources.

In some embodiments, the data of database 110 may comprise one or more of conventional tabular data, row-based data, column-based data, and object-based data. Moreover, the data may be indexed and/or selectively replicated in an index to allow fast searching and retrieval thereof. Database 110 may support multi-tenancy to separately support multiple unrelated clients by providing multiple logical database systems which are programmatically isolated from one another.

Database 110 may implement an "in-memory" database, in which a full database is stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

Client 120 may comprise one or more individuals or devices executing program code of a software application for presenting and/or generating user interfaces to allow interaction with application server 130, the database 110, and virtual machine 145. Presentation of a user interface as described herein may comprise any degree or type of rendering, depending on the type of user interface code generated by application server 130.

For example, a client 120 may execute a Web Browser to request and receive a Web page (e.g., in HTML format) from a website application 135 of application server 130 to access the load balancer module 140 via HTTP, HTTPS, and/or WebSocket, and may render and present the Web page according to known protocols. The client 120 may also or alternatively present user interfaces by executing a stand-alone executable file (e.g., an .exe file) or code (e.g., a JAVA applet) within a virtual machine.

FIGS. 2-7 include a flow diagram of a process 200 (FIG. 2) for distributing an iflow according to some embodiments. Process 200 may be executed by the software architecture 125 according to some embodiments. In one or more embodiments, the software architecture 125 (e.g., virtual machine 145 or application server 130) may be conditioned to perform the process 200, such that a processor 810 (FIG. 8) of the system 100 is a special purpose element configured to perform operations not performable by a general-purpose computer or device.

All processes mentioned herein may be executed by various hardware elements and/or embodied in processor-executable program code read from one or more of non-transitory computer-readable media, such as a hard drive, a floppy disk, a CD-ROM, a DVD-ROM, a Flash drive, Flash memory, a magnetic tape, and solid state Random Access Memory (RAM) or Read Only Memory (ROM) storage units, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

User interfaces 400/500/600/700 (FIGS. 4, 5, 6, 7) may be presented on any type of display apparatus (e.g., desktop monitor, smartphone display, tablet display) provided by any type of device (e.g., desktop system, smartphone, tablet computer). One or more embodiments may include a UI renderer (not shown) which is executed to provide user interface 400/500/600/700 and may comprise a Web Browser, a standalone application, or any other application. Embodiments are not limited to user interface 400/500/600/700 of FIGS. 4, 5, 6, 7.

Prior to the start of the process 200, a user is assigned one or more virtual machines 145 in a cloud environment where the set of integration steps may be deployed. In the non-exhaustive example shown in FIG. 7, the user is assigned three virtual machines 145.

Figures 3, 4, 5:
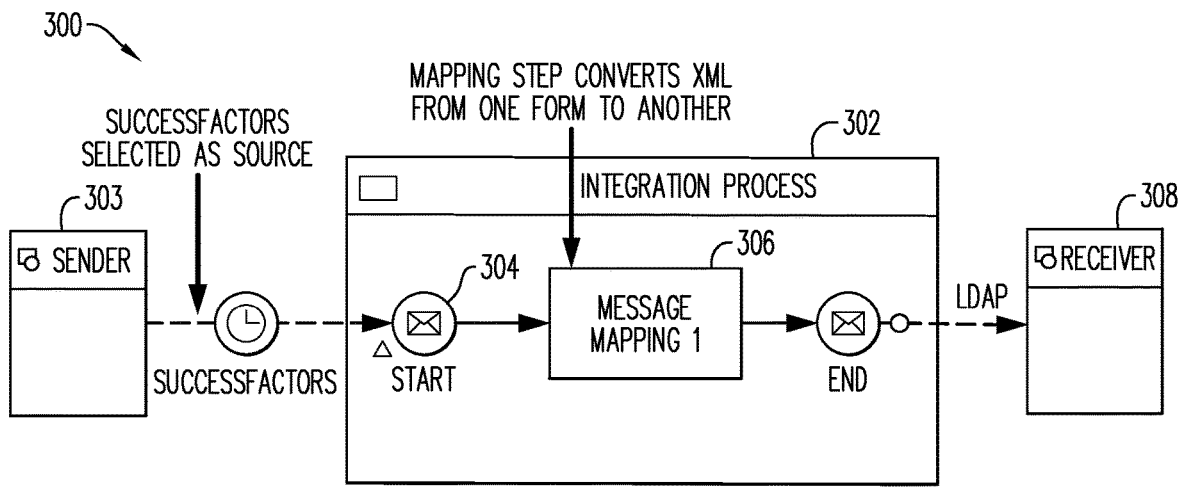
FIG. 3 is a user interface according to some embodiments.
FIG. 4 is a user interface according to some embodiments.
FIG. 5 is a user interface according to some embodiments.

Initially, at S210 a user (not shown) initiates an application integration component 137. In one or more embodiments, the application integration component may be an integration application (e.g., SAP Cloud Platform Integration, Dell Bhoomi, Tibco, etc.). The application integration component 137 may be used to connect cloud applications (e.g., source cloud application) with other cloud and on-premises applications (receiver or destination applications). The user may then be presented with a graphical user interface 300 (FIG. 3) and may design the integration steps/iflow 302 in S212. In one or more embodiments, the user may select a source cloud application 303 which may be integrated with a receiver or destination application 308. As shown in FIG. 3, the source cloud application 303 may be provided by an SAP Successfactors® system, for example, or another suitable source. In one or more embodiments, the integration process 302 may include a mapping step which converts the data from the source cloud application 303 to another form that is understandable by the receiver/destination application 308 (e.g., an LDAP application, as shown in FIG. 3). It is noted that the source and receiver applications may be different and may not understand the data that is transferred between them. As such, the integration process 302 transforms the data via the mapping step. Once the data is transformed, it may be sent to the receiver 308 (e.g., LDAP). The iflow 302 may include a timer 304 to schedule the integration. The iflow 302 may also include a message mapping process 306, as described above. The message mapping process 306 may convert data in one format (e.g., XML) to another format, to be transmitted to (integrated with) the receiver 308. In one or more embodiments, the message mapping process 306 may transform the data files into a format or protocol used by the receiver 308. As a non-exhaustive example, the source cloud application 303 may be in a CSV 5 format, and the message mapping process 306 may transform the data files into an XML format, like the receiver 308.

In one or more embodiments, the user may select a start timer control 310 to create a schedule 402, via a scheduler 400 (FIG. 4) for the integration steps. The scheduler 400 may include user-selectable parameters 404 for when to execute the integration steps. For example, the parameters 404 may provide for the integration steps to be run once 404a, scheduled to run on a day 404b, or to have a recurring schedule 404c. Other suitable parameters may be included. In the non-exhaustive example shown in FIG. 4, the user has selected the schedule on day parameter 404b, which may result in other parameters being presented to the user. As shown in FIG. 4, the other parameters may include an "on date" field 406, an "on time" 408 field, an "every" field 410 and a time zone 412. Other suitable fields may be used. In this instance, the user has selected the "every" field 410 to have the integration steps executed every section between 00:00 and 24:00 hours in the GMT time zone 412. As an alternative, the user may have selected the "on time" field 408 to have the integration steps execute at 3:46 pm, for example (indicated by the greyed-out field).

Figure 7:
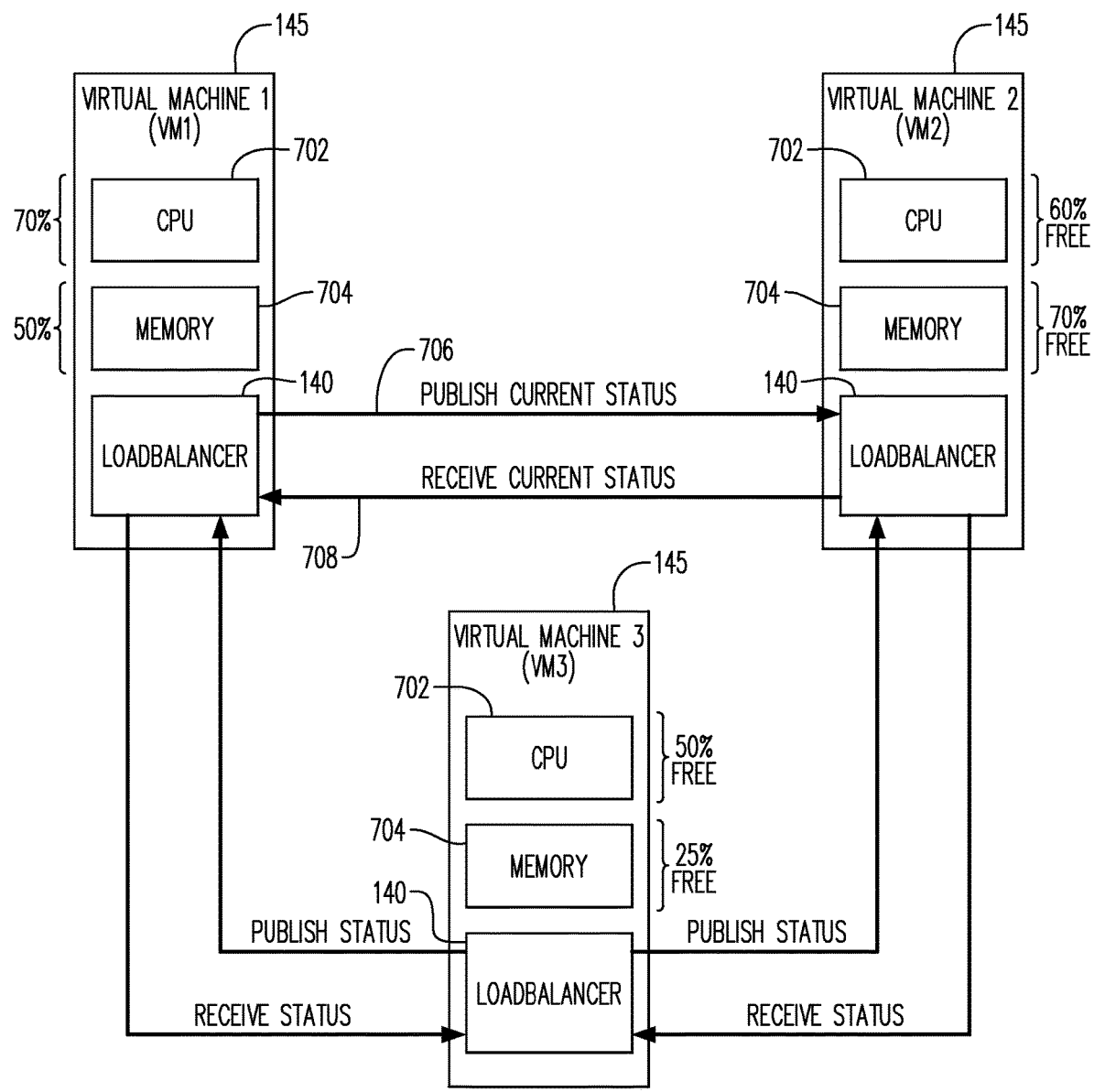
FIG. 7 is a block diagram according to some embodiments.

Then in S214, the user may select an element of a virtual machine, where the element may be used to select, via the load balancer module 140, the virtual machine to execute the set of integration steps. The user may select which element is of most importance to the integration steps that they have configured. As used herein, the terms "element", "resource" and "resource element" may be used interchangeably. The resource element may be memory 702 (FIG. 7) or CPU processing time 704 (FIG. 7). Other suitable resource elements may be used. For example, FIG. 5 provides a user interface 500 including a user entry field 502 for a load balancer 504. The user entry field 502 may include a drop-down list of the resource elements 506 of the virtual machine 145. In this instance the user-selectable resource elements may be CPU, memory, and none. It is noted that by selecting CPU or memory, the user decides to execute the load balancer module 140. It is also noted that by selecting "none," the user decides not to execute the load balancer module.

Figure 6:
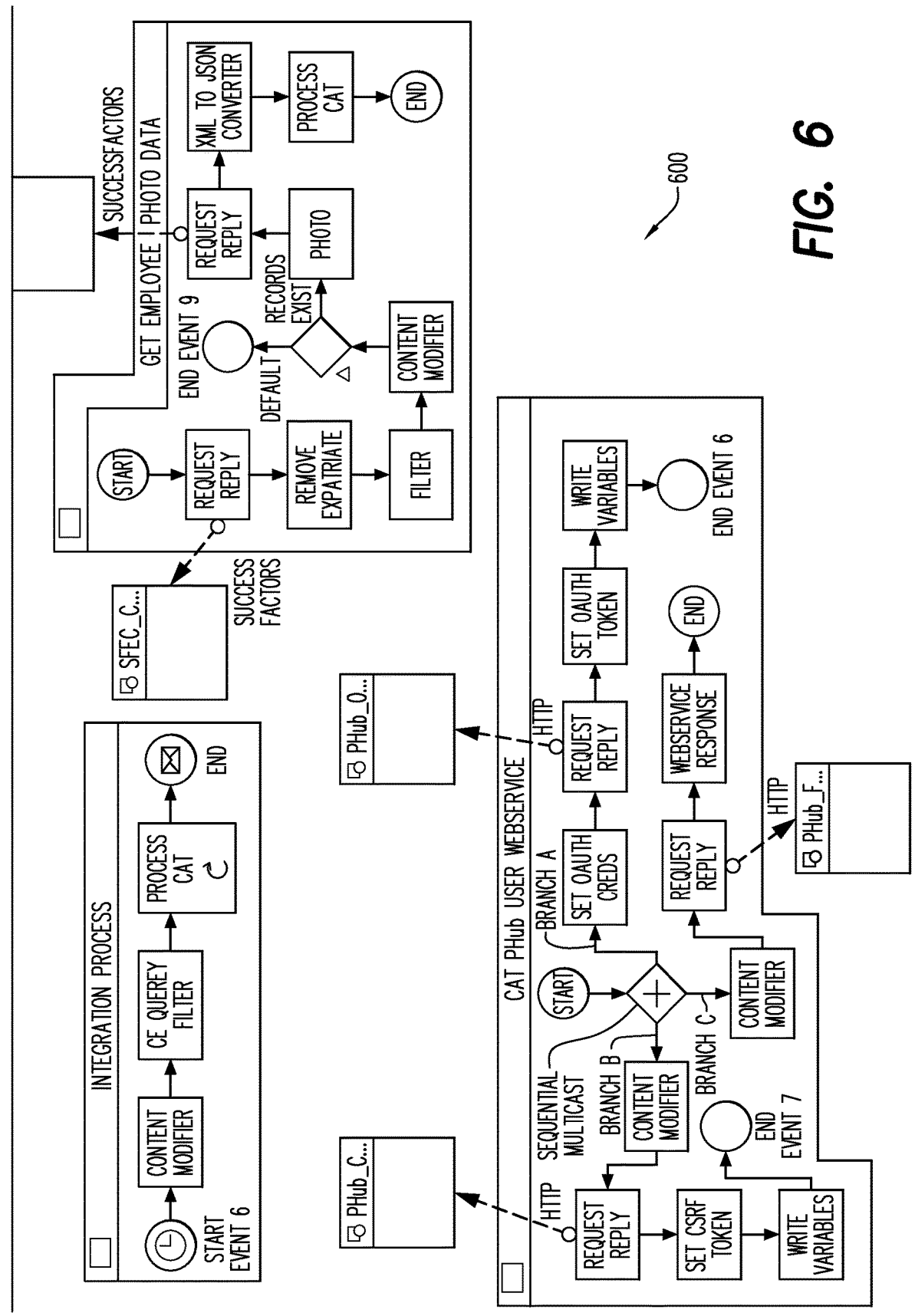
FIG. 6 is a user interface according to some embodiments.

It is also noted that the iflow 302 in FIG. 3 may be relatively simple, and the process 200 described herein is also applicable to more complex iflows 600, as shown in FIG. 6.

The set of integration steps is then deployed on all of the virtual machines 145 in S216. When the scheduled time for execution of the set of integration steps occurs, the timer 304 starts the integration steps on all of the virtual machines. However, before the integration steps may be executed, the virtual machine must acquire the lock. It is noted that in one or more embodiments, after modeling the integration steps, the user selects when the integration should happen via, for example, the timer component, which may be when the user schedules the start of the integration. The performance of instructions specified using the integration steps at the schedule time may be referred to as "execution. As described above, the virtual machine that succeeds in acquiring the lock executes the integration flow.

After the timer 304 starts the integration steps, the publisher 160 for each virtual machine broadcasts 706 (FIG. 7) the current state of its virtual machine to the peer virtual machines in S218. As used herein, "peer virtual machines" may refer to the other virtual machines assigned to the user, besides the one broadcasting the status. In one or more embodiments, the current state may be broadcast via HTTP protocol, or any other suitable communication protocol. The current state may include the current element status (e.g., current available memory or current available CPU processing time), and a virtual machine identifier, which may be used to uniquely identify the virtual machine to the peer virtual machines. In one or more embodiments, the broadcast current state may be received by the resource manager 162 of the peer virtual machine. As used herein, the terms "resource manager" and "element manager" may be used interchangeably.

Then in S220, the resource manager 162 determines which of the virtual machines has a pre-set amount of the user selected element. In one or more embodiments, the pre-set amount may be the most of the user selected element. For example, a first virtual machine has the most memory compared to the second and third peer virtual machines. In other embodiments, the pre-set amount may be a threshold value. For example, a memory threshold value is 70%, and a first virtual machine has 70% memory available, while the second and third peer virtual machines have only 40% and 30% available, respectively. As another example, instead of a user selecting an element in S214, a threshold value is set such that any virtual machine that has any resource element that reaches the threshold may be determined to have the pre-set amount. The pre-set amount may be selected by the user or may be a default value. In one or more embodiments, the resource manager 162 may compare its virtual machine state with that of its peers, and/or in some instances with that of the threshold value. When the resource manager 162 determines in S220 its virtual machine does not have the most user-selected resource element compared to its peer virtual machines, or does not reach the threshold value, the resource manager 162 ends the integration process for that virtual machine in S222. When the resource manager 162 determines in S220 its virtual machine has the most of the user-selected resource element compared to its the peer virtual machines, or its virtual machine has at least the threshold value, the process 200 proceeds to S224 and the resource manager 162 retrieves the mutual exclusion component 166 from the lock mechanism 164. As used herein, the terms "lock" and "mutual exclusion component" may be used interchangeably. It is noted that when more than one virtual machine has the most of the resource elements, or at least meets the threshold value, the resource manager 162 for each respective virtual machine may use an application programming interface (API) to acquire the lock 166 from a database where the locks are stored. The lock mechanism 164 may only allow one virtual machine to acquire the lock 166.

Next, in S226, the integration steps are executed by the virtual machine that acquired the lock 166. As described above, each step in the integration steps determines what should be done with the data. For example, execution of a CSV to XML Converter Integration step may convert a CSV file to an XML file; execution of a Mapping Integration step may convert an XML file from a source system to another form that is acceptable to receiver/destination system. As a non-exhaustive example of a use case, in an organization once new employee joins, Onboarding is done on SAP's SuccessFactors® system, which may be considered the source system. Once the user is Onboarded he may receive access to an email account and he may also be provided with an access card. The email account and access card provision may be provided via an LDAP system, which may be considered the receiver/destination system. Since the source (SuccessFactors System) and destination (LDAP system) are different systems and cannot communicate with each other, integration may be used to allow for the communication. The user may now model the integration steps to get data from SuccessFactors system and copy this to LDAP system. Once modeled the iflow steps are scheduled at a particular time and then deployed in virtual machines. As such, when a new employee data is entered in SuccessFactors system, the iflow steps copy the data to LDAP system.

FIG. 7 provides a non-exhaustive example according to some embodiments. The system includes three virtual machines 145—virtual machine (VM)1, VM2, and VM3. Each virtual machine 145 includes a memory resource element 702, a CPU processing time resource element 704 and a load balancer module 140. As shown herein, each virtual machine 145 has a certain amount of each resource element available. For example, VM1 has 70% available CPU and 50% available memory; VM2 has 60% available CPU and 70% memory; and VM3 has 50% available CPU and 25% available CPU. In an instance where a user selected memory as the resource element in S214, when the scheduled time arrives, VM1 publishes/broadcasts 706, via its publisher 160, its current memory status (50% free) to the resource managers 162 at VM2 and VM3; simultaneously, or substantially at the same time, VM2 publishes 706, via its publisher 160, its current memory status (70% free) to the resource manager 162 at VM1 and VM3 (e.g., the resource manager receives the status 708); and simultaneously, or substantially at the same time, VM3 publishes 706, via its publisher 160, its current memory status (25% free) to the resource manager at VM1 and VM2. As used herein, the terms "broadcast" and "publish" may be used interchangeably. Then, in a scenario where the resource manager is selecting the virtual machine based on which has the most resource available, the resource manager at VM1 compares its 50% to the 70% (VM2) and 25% (VM3), determines in S220 it does not have the most available memory resource element, and ends its process in S222 and therefore does not execute the integration steps. Similarly, the resource manager at VM 3 compares its 25% to the 50% (VM1) and 70% (VM2), determines it does not have the most available memory resource element, and ends its process, and therefore does not execute the integration steps. The resource manager at VM 2 compares its 70% to the 50% (VM1) and 25% (VM3), determines it has the most available memory resource element, and proceeds to acquire the lock 166 from the lock mechanism 164. After VM3 acquires the lock 166, it may execute the integration steps. The same steps may be executed when the user selects the CPU resource element.

Figure 8:
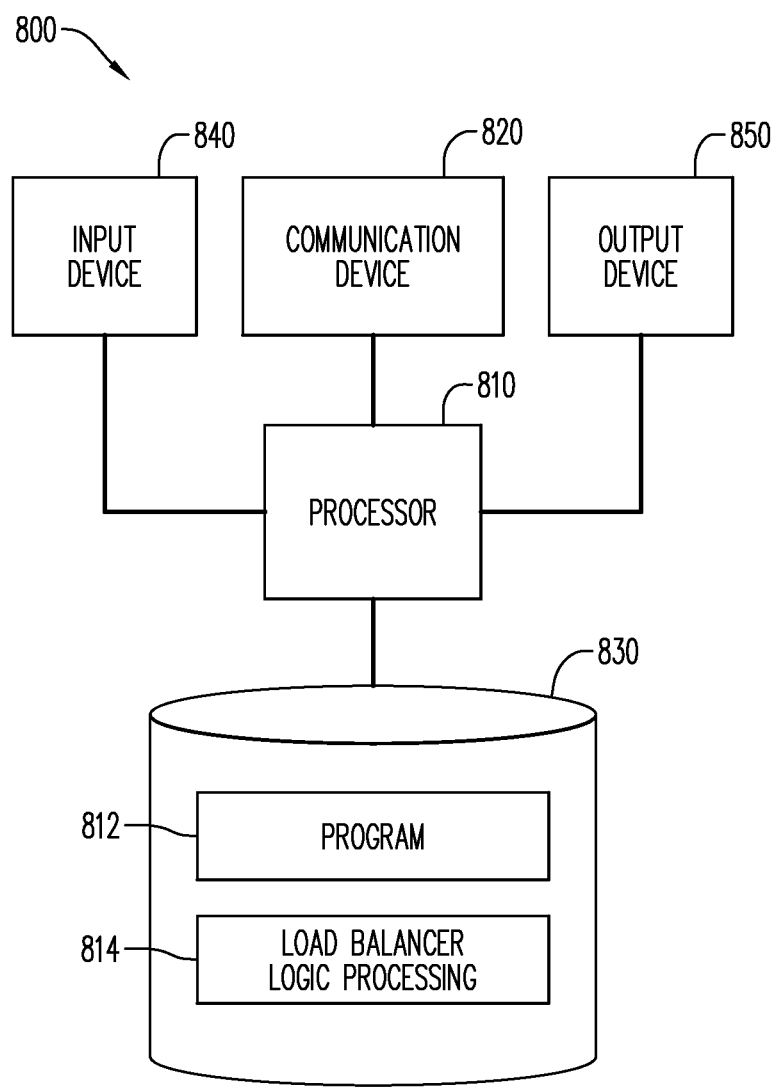
FIG. 8 is a block diagram of a system according to some embodiments.

FIG. 8 is a block diagram of apparatus 800 according to some embodiments. Apparatus 800 may comprise a general- or special-purpose computing apparatus and may execute program code to perform any of the functions described herein. Apparatus 800 may comprise an implementation of one or more elements of system 100. Apparatus 800 may include other unshown elements according to some embodiments.

Apparatus 800 includes a load balancer processor 810 operatively coupled to communication device 820, data storage device 830, one or more input devices 840, one or more output devices 850 and memory 860. Communication device 820 may facilitate communication with external devices, such as application server 130. Input device(s) 840 may comprise, for example, a keyboard, a keypad, a mouse or other pointing device, a microphone, knob or a switch, an infra-red (IR) port, a docking station, and/or a touch screen. Input device(s) 840 may be used, for example, to manipulate graphical user interfaces and to input information into apparatus 800. Output device(s) 850 may comprise, for example, a display (e.g., a display screen) a speaker, and/or a printer.

Data storage device/memory 830 may comprise any device, including combinations of magnetic storage devices (e.g., magnetic tape, hard disk drives and flash memory), optical storage devices, Read Only Memory (ROM) devices, Random Access Memory (RAM) etc.

The storage device 830 stores a program 812 and/or load balancer platform logic 814 for controlling the processor 810. It is noted that program 812 and/or load balancer platform logic 814 may also be stored and executed from an application server or from any other environment (e.g., software architecture) that can execute software instructions. The processor 810 performs instructions of the programs 812, 814, and thereby operates in accordance with any of the embodiments described herein, including but not limited to process 300. The executable instructions of the programs 812, 814 represent the executable instructions of the software architecture, including implementation of the methods, modules, subsystems and components and so forth described herein and may also include memory and/or storage modules . . . etc.

The programs 812, 814 may be stored in a compressed, uncompiled and/or encrypted format. The programs 812, 814 may furthermore include other program elements, such as an operating system, a database management system, and/or device drivers used by the processor 810 to interface with peripheral devices.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of computing devices in communication with one another via any number of other public and/or private networks. Two or more of such computing devices may be located remotely from one another and may communicate with one another via any known manner of network(s) and/or a dedicated connection. Each computing device may comprise any number of hardware and/or software elements suitable to provide the functions described herein as well as any other functions. For example, any computing device used in an implementation of system 100 may include a processor to execute program code such that the computing device operates as described herein.

All systems and processes discussed herein may be embodied in program code stored on one or more computer-readable non-transitory media. Such non-transitory media may include, for example, a fixed disk, a floppy disk, a CD-ROM, a DVD-ROM, a Flash drive, magnetic tape, and solid-state RAM or ROM storage units. Embodiments are therefore not limited to any specific combination of hardware and software.

The embodiments described herein are solely for the purpose of illustration. Those in the art will recognize other embodiments may be practiced with modifications and alterations limited only by the claims.

What is claimed is:

1. A system comprising:
   two or more virtual machines;
   a load balancer module;

a load balancer processor in communication with the load balancer module and operative to execute processor-executable process steps to cause the system to:
initiate an application integration component;
create a set of one or more integration steps to transfer data between a cloud-based application and a second application;
receive selection of an element of a virtual machine;
broadcast a current state of each virtual machine to the other virtual machines;
determine which of the two or more virtual machines has a pre-set amount of the selected element;
retrieve a mutual exclusion component, wherein the mutual exclusion component is retrieved by the virtual machine determined to have the pre-set amount of the selected element; and
execute the integration steps at the virtual machine that retrieved the mutual exclusion component.

2. The system of claim 1, wherein the application integration component is operative to provide communication between the cloud-based application and the second application.

3. The system of claim 1, wherein the element is one of a memory and a computer processing unit (CPU) processing time.

4. The system of claim 1, wherein the second application is one of a second cloud-based application and an on-premises application.

5. The system of claim 1, wherein the load balancer module includes a publisher, an element manager, and a mutual exclusion component mechanism.

6. The system of claim 1, further comprising a scheduler, wherein processor-executable process steps to cause the system to:
receive, at the scheduler, a schedule for execution of the set of one or more integration steps.

7. The system of claim 1, wherein the pre-set amount is one of the most or a threshold value.

8. The system of claim 7, wherein the pre-set amount is one of determined by a user or a default value.

9. A computer-implemented method comprising:
providing two or more virtual machines;
initiating an application integration component;
creating a set of one or more integration steps to transfer data between a cloud-based application and a second application;
receiving selection of one of an available memory and available computer processing unit (CPU) processing time of a first virtual machine of the two or more virtual machines;
broadcasting a current state of a first virtual machine to other virtual machines of the two or more virtual machines;
determining which of the two or more virtual machines has a pre-set amount of the selected one of available memory and available CPU processing time;
retrieving a mutual exclusion component, wherein the mutual exclusion component is retrieved by the virtual machine determined to have the pre-set amount of the selected one of available memory and available CPU processing time; and
executing the integration steps at the virtual machine that retrieved the mutual exclusion component.

10. The method of claim 9, wherein the application integration component is operative to provide communication between the cloud-based application and the second application.

11. The method of claim 9, wherein the second application is one of cloud-based and on-premises.

12. The method of claim 9, wherein the load balancer module includes a publisher, an element manager, and a mutual exclusion component mechanism.

13. The method of claim 9, further comprising:
receiving, at a scheduler, a schedule for execution of the set of one or more integration steps.

14. The method of claim 9, wherein the pre-set amount is one of the most or a threshold value.

15. The method of claim 14, wherein the pre-set amount is one of determined by a user or a default value.

16. A non-transitory computer-readable medium storing program code, the program code executable by a computer system to cause the computer system to:
initiate an application integration component;
create a set of one or more integration steps to transfer data between a cloud-based application and a second application;
receive selection of an element of a first virtual machine of two or more virtual machines;
broadcast a current state of each virtual machine to the other virtual machines;
determine which of the two or more virtual machines has a pre-set amount of the selected element;
retrieve a mutual exclusion component, wherein the mutual exclusion component is retrieved by the virtual machine determined to have the pre-set amount of the selected element; and
execute the integration steps at the virtual machine that retrieved the mutual exclusion component.

17. The medium of claim 16, wherein the application integration component is operative to provide communication between the cloud-based application and the second application.

18. The medium of claim 16, wherein the element is one of a memory and a computer processing unit (CPU) processing time.

19. The medium of claim 16, wherein the second application is one of a second cloud-based application and an on-premises application.

20. The medium of claim 16, wherein the load balancer module includes a publisher, an element manager, and a mutual exclusion component mechanism.

* * * * *